US012091299B2

(12) United States Patent
Woo

(10) Patent No.: US 12,091,299 B2
(45) Date of Patent: Sep. 17, 2024

(54) FORKLIFT AND SELF-CHARGING APPARATUS THEREFOR

(71) Applicants: HYUNDAI MOTOR COMPANY, Seoul (KR); Kia Corporation, Seoul (KR)

(72) Inventor: Myeong Nam Woo, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 452 days.

(21) Appl. No.: 17/369,157

(22) Filed: Jul. 7, 2021

(65) Prior Publication Data

US 2022/0009760 A1 Jan. 13, 2022

(30) Foreign Application Priority Data

Jul. 7, 2020 (KR) ........................ 10-2020-0083531

(51) Int. Cl.
*B66F 9/075* (2006.01)
*B66F 9/24* (2006.01)

(52) U.S. Cl.
CPC ............ *B66F 9/07504* (2013.01); *B66F 9/24* (2013.01)

(58) Field of Classification Search
CPC ............................. B66F 9/075504; B66F 9/24
See application file for complete search history.

(56) References Cited

U.S. PATENT DOCUMENTS

| | | | | |
|---|---|---|---|---|
| 2014/0231176 A1* | 8/2014 | Zanichelli | ................ | B66F 9/08 187/226 |
| 2020/0212816 A1* | 7/2020 | Sun | ...................... | H02J 7/0018 |

* cited by examiner

*Primary Examiner* — Robert Grant
(74) *Attorney, Agent, or Firm* — MORGAN, LEWIS & BOCKIUS LLP

(57) ABSTRACT

The present disclosure relates to a forklift and a self-charging apparatus therefor. A forklift includes a guide disposed in a forklift body, a feeder that moves together with a forklift fork along the guide, a power generator coupled to one of the guide or the feeder to make contact with a remaining of the guide or the feeder, and that produces electricity through rotation thereof due to the contact during relative movement between the guide and the feeder, and a battery that stores the electricity produced by the power generator.

12 Claims, 9 Drawing Sheets

FORKLIFT AND SELF-CHARGING APPARATUS THEREFOR

CROSS-REFERENCE TO RELATED APPLICATION

This application claims the benefit of priority to Korean Patent Application No. 10-2020-0083531, filed in the Korean Intellectual Property Office on Jul. 7, 2020, the entire contents of which are incorporated herein by reference.

TECHNICAL FIELD

The present disclosure relates to a forklift and a self-charging apparatus therefor.

BACKGROUND

In general, forklifts are used to raise, lower, or carry cargo, and are classified into engine type forklifts and electric forklifts according to power sources. Among them, an electric forklift uses electricity that is supplied from a battery as a power source, and has no exhaust gas, generates little noise, and is mainly used for an interior operation as compared with an engine forklift In the electric forklift, a driving motor, a hydraulic motor, and a battery are installed while an engine and a fuel tank are removed from an engine type forklift, and the driving motor and the hydraulic motor are driven by batteries and a steering operation, a driving operation, and an operation of an operator are performed by oil discharged from the hydraulic pump driven through the corresponding motor. Accordingly, the performance of the electric forklift is closely related to the efficiency of the battery.

Meanwhile, a hydrogen fuel cell vehicle that has been developed recently secures the efficiency of a battery by using a high-voltage battery and a hydrogen fuel cell system as power sources together during ascending driving (an ascending inclination), using the hydrogen fuel cell system during driving on a flatland, and finally using a regenerative brake scheme of charging the battery by converting potential energy into electrical energy with a motor reducer during descending driving (a descending inclination). Studies for applying the hydrogen fuel cell to an electric forklift have been made.

However, the conventional forklift travels on a flatland and does not have a travel distance that is not sufficient enough to charge the battery because most of flows of human traffic are made in working sites, and thus it is difficult to apply a regenerative brake technology to the forklift.

SUMMARY

The present disclosure has been made to solve the above-mentioned problems occurring in the prior art while advantages achieved by the prior art are maintained intact.

As aspect of the present disclosure provides a forklift having an improved battery charging efficiency and a self-charging apparatus.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a forklift includes a guide disposed in a forklift body, a feeder that moves together with a forklift fork along the guide, a power generator coupled to one of the guide or the feeder to make contact with a remaining one of the guide or the feeder, and that produces electricity through rotation thereof due to the contact during relative movement between the guide and the feeder, and a battery that stores the electricity produced by the power generator.

In another embodiment, the power generator may include a rotor that rotates due to the contact, and a generator including a rotary shaft that receives a rotational force of the rotor and rotate for generation of power.

In another embodiment, the rotor may include a first disk disposed in the one of the guide or the feeder to make the contact the remaining one of the guide or the feeder, and coupled to the one of the guide or the feeder to be rotatable about a first axis due to the contact.

In another embodiment, the rotor may further include a second disk that rotates about the first axis together with the first disk, coupled to the first disk, and having gear teeth on a circumferential surface thereof, and the rotary shaft may have gear teeth engaged with the gear teeth of the second disk on a circumferential surface thereof to receive a rotational force from the second disk.

In another embodiment, when a leftward or rightward direction is defined along a horizontal direction that is perpendicular to a vertical direction, the guide may include a guide body extending in the vertical direction, a left guide wall protruding from a left end of the guide body in a direction that is perpendicular to the vertical direction and the horizontal direction, and formed at the left end of the guide body along the vertical direction, and a right guide wall protruding from a right end of the guide body in parallel to a protrusion direction of the left guide wall, and formed at the right end of the guide body along the vertical direction, and the feeder may be disposed between the left guide wall and the right guide wall.

In another embodiment, the power generator may include a rotor being rotatable about a first axis that is in parallel to the protrusion direction of the left guide wall, and coupled to the feeder to contact the left guide wall, and a generator including a rotary shaft that receives a rotational force of the rotor and rotates for generation of power.

In another embodiment, the power generator may further include a fixing shaft including a shaft portion extending in the direction of the first axis to form the first axis and coupled to the rotor, and a head portion disposed at one of opposite ends of the shaft portion, which is not coupled to the rotor, and having a diameter that is larger than a diameter of the shaft portion.

In another embodiment, the feeder may include a feeder body extending in the vertical direction and disposed between the left guide wall and the right guide wall, a first hole passing through the feeder body in the direction of the first axis such that the shaft portion is inserted thereinto, and a second hole formed on a surface of the feeder body, which is located on a side that is opposite to a side, on which the rotor is located, to be continuous to the first hole in the direction of the first axis, and having a diameter that is larger than a diameter of the first hole to accommodate the head portion.

In another embodiment, the power generator may further include a bearing that supports the shaft portion of the fixing shaft during rotation of the fixing shaft, and the feeder may further include a third hole formed in the feeder body to be continuous to the first hole in the direction of the first axis on an opposite side to the second hole, and having a diameter that is larger than a diameter of the first hole to accommodate the bearing.

In another embodiment, the left guide wall may include a left guide wall body formed at the left end of the guide body along the vertical direction, a feeder contact surface extending in the left guide wall body along the vertical direction, disposed to be adjacent to the guide body, and being contacted with the feeder, a rotor contact surface extending in the left guide wall body along the vertical direction, located in the protrusion direction of the feeder contact surface, and being contacted with the rotor as the feeder moves, and a partition member protruding from the left guide body toward the right guide wall, disposed between the feeder contact surface and the rotor contact surface, and partition the feeder contact surface and the rotor contact surface from each other.

In another embodiment, the forklift may further include a frictional material applied to a circumferential surface of the rotor.

In another embodiment, the feeder may include a first feeder body extending in a vertical direction, a second feeder extending from an upper distal end of the first feeder to be perpendicular to the vertical direction, and a hydraulic pump connected to the second feeder body and that moves the feeder.

In another embodiment, the battery may include a bi-direction high voltage DC-DC converter (BHDC) that charges a high-voltage battery, and a low DC-DC converter (LDC) that charges a low-voltage battery.

According to another aspect of the present disclosure, a self-charging apparatus includes a guide extending in an upward or downward direction, a feeder configured such that upward or downward movement thereof is guided by the guide, configured such that an article is seated on an upper side of the feeder, that moves upwards with a hydraulic pump, and that moves downwards by a load of the article and a self-weight thereof, a rotor coupled to one of the guide or the feeder to make contact with a remaining one of the guide or the feeder, and that rotates forwardly or reversely with a frictional force generated due to the contact, and a generator that produces electricity due to rotation of a rotary shaft that rotates in conjunction with the rotation of the rotor.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
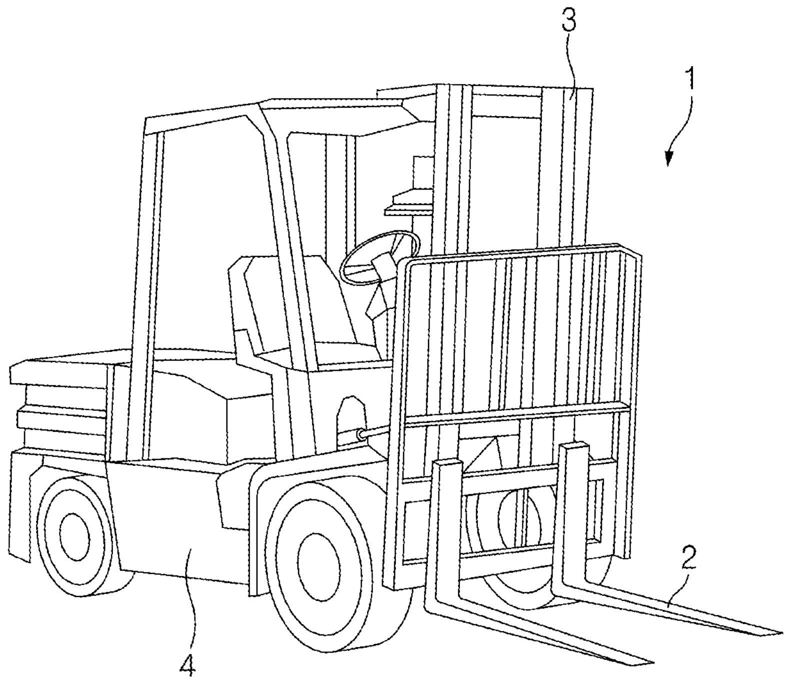
FIG. 1 is a perspective view conceptually illustrating a conventional forklift.

Hereinafter, some embodiments of the present disclosure will be described in detail with reference to the exemplary drawings. In providing reference numerals to the constituent elements of the drawings, the same elements may have the same reference numerals even if they are displayed on different drawings. Further, in the following description of the present disclosure, a detailed description of known functions and configurations incorporated herein will be omitted when it may make the subject matter of the present disclosure rather unclear.

An embodiment of the present disclosure relates to a forklift having an improved battery charging efficiency. FIG. 1 is a perspective view conceptually illustrating a conventional forklift. The conventional forklift 1 includes a fork 2 that supports an article, and a mast 3 that is coupled to the fork 2 and is slid upwards and downward to move the fork 2 upwards and downwards. The other configurations of the forklift according to an embodiment, excluding the mast 3, are similar to those of the conventional forklift, and thus a detailed description thereof will be omitted.

Figure 2:
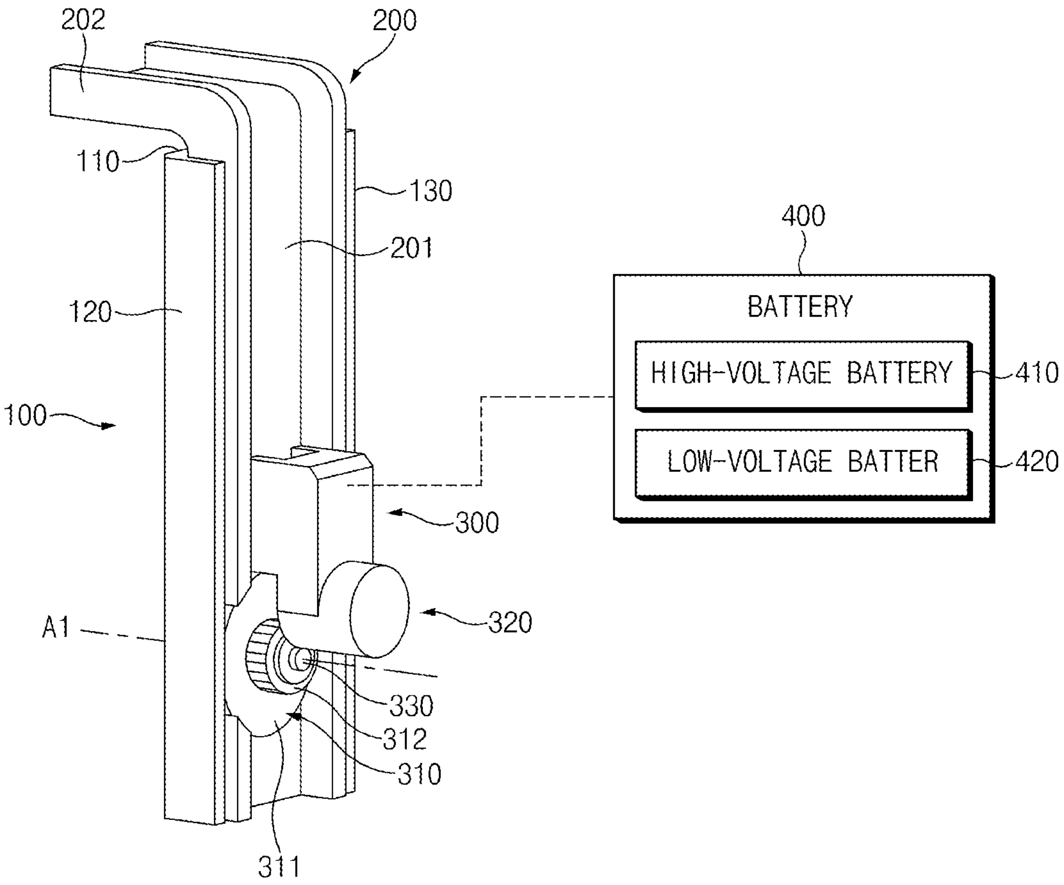
FIG. 2 is a perspective view illustrating a guide, a feeder, a power generator, and a battery of a forklift according to an embodiment of the present disclosure.
Figure 3:
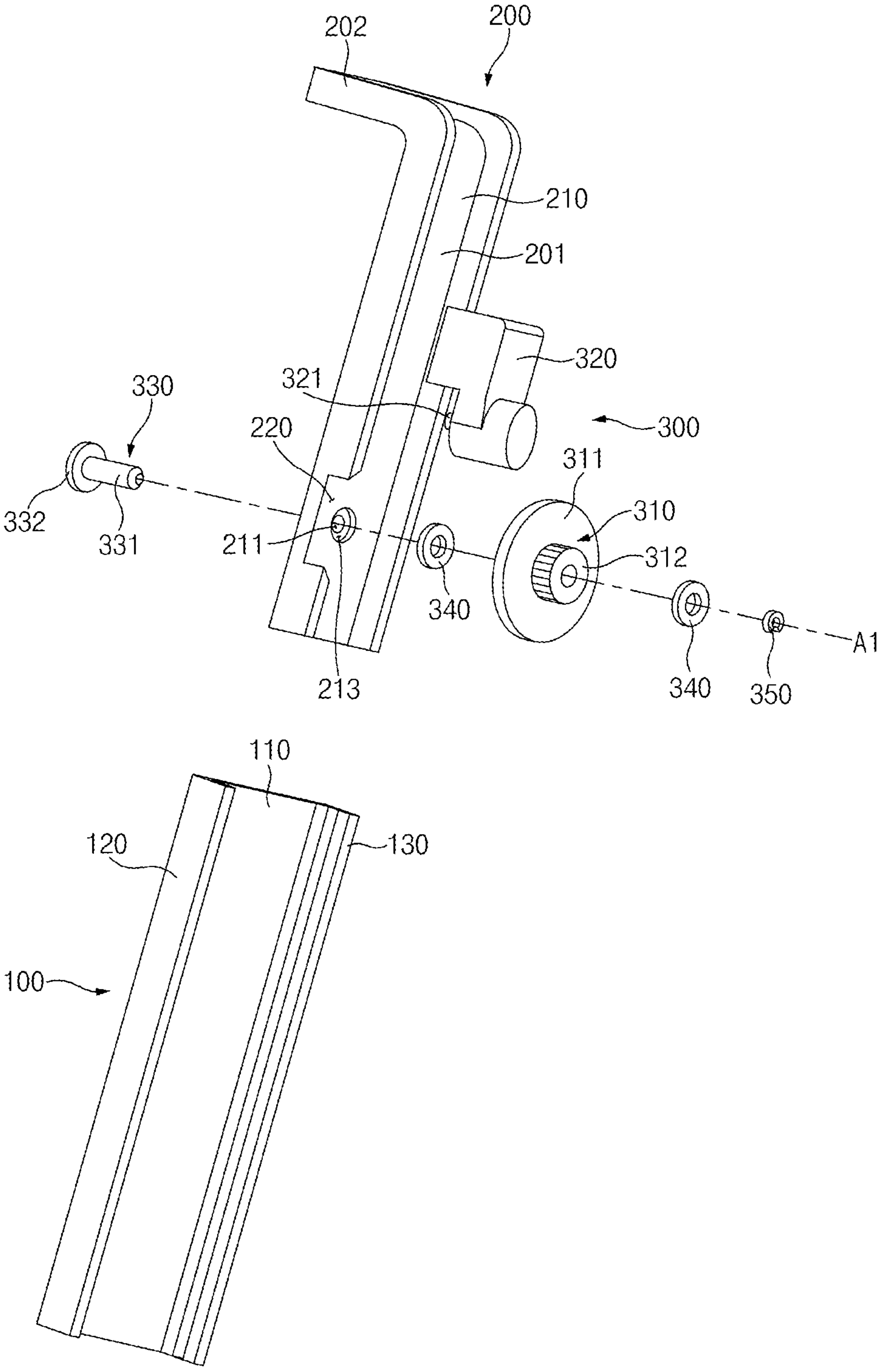
FIG. 3 is an exploded perspective view illustrating a guide, a feeder, and a power generator of a forklift according to an embodiment of the present disclosure.

An embodiment of the present disclosure relates to a forklift that may convert potential energy due to a load of an article seated on a fork and a self-weight of the fork into electrical energy to utilize the electrical energy. The forklift according to the embodiment of the present disclosure may include a guide 100, a feeder 200, a power generator 300, and a battery 400. FIG. 2 is a perspective view illustrating the guide 100, the feeder 200, the power generator 300, and the battery 400 of a forklift according to an embodiment of the present disclosure. FIG. 3 is an exploded perspective view illustrating the guide 100, the feeder 200, and the power generator 300 of a forklift according to an embodiment of the present disclosure.

The guide 100 may be provided in a forklift body 4. The guide 100 may be fixed to the forklift body 4. The feeder 200 may be configured to move along the guide 100 together with a forklift fork 2. The guide 100 and the feeder 200 may correspond to the mast of the conventional forklift.

The power generator 300 may be coupled to one of the guide 100 and the feeder 200 to contact the other of the guide 100 and the feeder 200. That is, the power generator 300 may be coupled to the guide 100 and contact the feeder 200, and may be coupled to the feeder 200 and contact the guide 100. FIG. 2 illustrates that the power generator 300 is coupled to the feeder 200 and contacts the guide 100.

The power generator 300 may be configured to produce electricity through rotation thereof due the contact during relative movement of the guide 100 and the feeder 200. Here, the relative movement may refer to movement, by which relative locations of the feeder 200 and the guide 100 change as the feeder 200 moves along the guide 100 together with the forklift fork 2. The rotation due to the contact may be caused by a frictional force generated as the power generator 300 contacts the guide 100 or the feeder 200.

The battery 400 may be configured to store the electricity produced by the power generator 300. The battery 400 may include a high-voltage battery 410 and a low-voltage battery 420. The high-voltage battery 410 may store power for driving of the forklift 1. The low-voltage battery 420 may store power that is used for an electric component system in the forklift.

The conventional forklift travels on a flatland and does not have a travel distance that is not sufficient enough to charge the battery because most of flows of human traffic are made in working sites, and thus the battery charging efficiency of the forklift is not good because it is difficult to apply a regenerative brake technology used for a hydrogen fuel battery vehicle to the forklift.

According to the present disclosure, because potential energy may be converted to electrical energy through relative movement of the guide 100 and the feeder 200, the battery charging efficiency of the forklift may be improved.

Power Generator 300

The power generator 300 may include a rotor 310. The rotor 310 may be configured to rotate due to the contact during relative movement of the guide 100 and the feeder 200. The power generator 300 may include a generator 320. As illustrated in FIG. 3, the generator 320 may include a rotary shaft 321. The rotary shaft 321 may receive a rotational force of the rotor 310 to rotate for generation of power.

Figure 4:
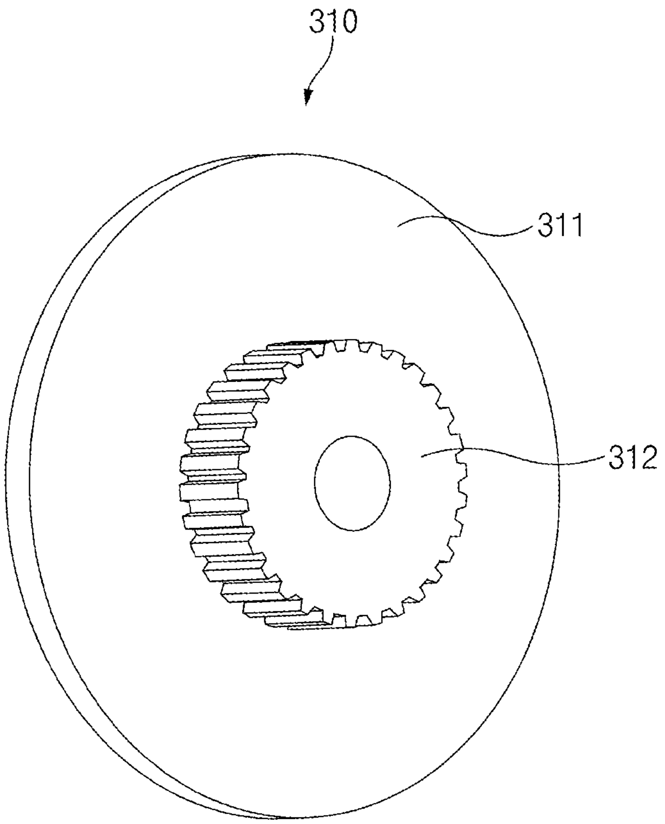
FIG. 4 is a perspective view illustrating a rotor of a forklift according to an embodiment of the present disclosure.

FIG. 4 is a perspective view illustrating the rotor 310 of a forklift according to an embodiment of the present disclosure. The rotor 310 may include a first disk 311 and a second disk 312. The first disk 311 may be disposed in one of the guide 100 and the feeder 200 to contact the other of the guide 100 and the feeder 200, and may be coupled to the one of the guide 100 and the feeder 200 to be rotatable about a first axis A1 due to the contact. The first axis A1 may be an imaginary axis that extends in a specific direction.

The second disk 312 may be configured to rotate about the first axis A1 together with the first disk 311. The second disk 312 may be coupled to the first disk 311. Gear teeth may be famed on a circumferential surface of the second disk 312. Gear teeth engaged with the gear teeth of the second disk 312 may be formed on a circumferential surface of the rotary shaft 321. The rotary shaft 321 may receive a rotational force from the second disk 312. As the second disk 312 and the rotary shaft 321 are engaged with each other, it is easy to transmit a rotational force of the second disk 312 to the rotary shaft 321. The number of the teeth of the second disk 312 may be larger than the number of the gear teeth of the rotary shaft 321. Because the rotational speed of the rotary shaft 321 becomes higher as the gear ratio of the second disk 312 and the rotary shaft 321 become larger, it may be advantageous in production of electricity. Although the drawings illustrate, for reference, that a difference between a diameter of the first disk 311 and a diameter of the second disk 312 is large, the illustrations are exemplary, and the diameter of the second disk 312 may be variously formed according to the rotational speed of the rotary shaft 321 that is to be achieved.

Guide 100

Hereinafter, the guide 100 will be described with reference to FIGS. 2 and 3. The guide 100 may include a guide body 110, a left guide wall 120, and a right guide wall 130. Here, the leftward/rightward direction may be defined to be a horizontal direction that is perpendicular to the vertical direction. Further, the leftward/rightward direction may be differently defined according to a sight direction of an observer. The guide body 110 may extend in the vertical direction. The left guide wall 120 may protrude from a left end of the guide body 110 in a direction that is perpendicular to the vertical direction and the horizontal direction. The left guide wall 120 may be formed at the left end of the guide body 110 along the vertical direction.

The right guide wall 130 may protrude from a right end of the guide body 110 in parallel to a protrusion direction of the left guide wall 120. The right guide wall 130 may be formed at a right end of the guide body 110 along the vertical direction. That is, when viewed from the top, the guide 100 may have a "stapler" shape or a "U" shape.

The feeder 200 may be disposed between the left and right guide walls 120 and 130. Because the feeder 200 is disposed between the left and right guide walls 120 and 130, it may move along the vertical direction while not deviating to the left side and the right side.

The rotor 310 may be rotatable about the first axis A1, and may be coupled to the feeder 200 to contact the left guide wall 120. Then, the first axis A1 may be disposed to parallel to the protrusion direction of the left guide wall 120. The feeder 200 may have a groove 220 such that a portion of the rotor 310 passes through the groove 220. For example, when the feeder 200 also has a surface that faces the left and right guide walls 120 and 130, the rotor 310 may contact the left guide wall 120 only when the rotor 310 passes through the feeder 200. In this case, as illustrated in FIG. 3, the groove 220 may be formed on the surface of the feeder 200, which faces the left guide wall 120. As the groove 220 is formed, a portion of the rotor 310 may pass through the feeder 200 and contact the left guide wall 120.

Fixing Shaft 330

Figure 5:
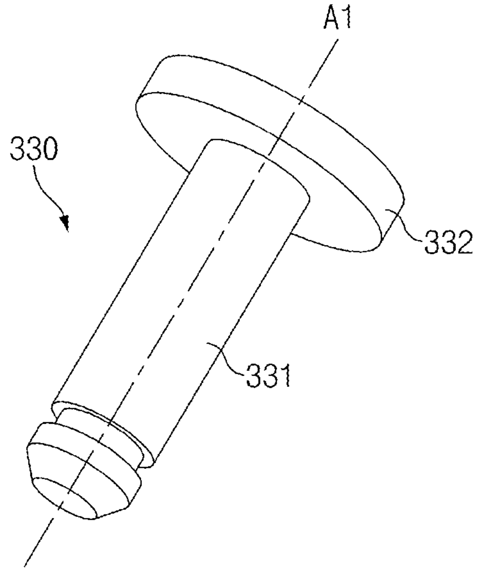
FIG. 5 is a perspective view illustrating a fixing shaft of a forklift according to an embodiment of the present disclosure.

The power generator 300 may further include a fixing shaft 330. FIG. 5 is a perspective view illustrating the fixing shaft 330 of a forklift according to an embodiment of the present disclosure. The fixing shaft 330 may include a shaft portion 331 and a head portion 332. The shaft portion 331 may extend in a direction of the first axis A1 to form the first axis A1. The shaft portion 331 may be coupled to the rotor 310. The head portion 332 may be provided at one end of the shaft portion 331, which is not coupled to the rotor 310. The head portion 332 may have a diameter that is larger than a diameter of the shaft portion 331. That is, the fixing shaft 330 may have a shape such as a nail. Because the head portion 332 is formed to have a diameter that is larger than the diameter of the shaft portion 331, it may support an axial load applied to the rotor 310.

Feeder 200

Figure 6:
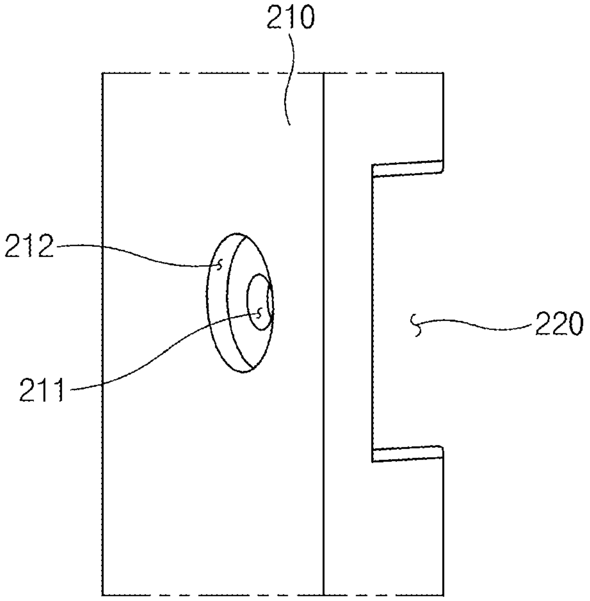
FIG. 6 is an enlarged perspective view illustrating a portion of a second hole in a feeder body of a forklift according to an embodiment of the present disclosure.

The feeder 200 may include a feeder body 210, a first hole 211, and a second hole 212. FIG. 6 is an enlarged perspective view illustrating a portion of the second hole 212 in the feeder body 210 of a forklift according to an embodiment of the present disclosure. The feeder body 210 may extend in the vertical direction, and may be disposed between the left and right guide walls 120 and 130. The first hole 211 may configured such that the shaft portion 331 is inserted thereinto. The first hole 211 may be formed to pass through the feeder body 210 in the direction of the first axis A1. The second hole 212 may be formed on a surface of the feeder body 210, which is located on a side that is opposite to a side, on which the rotor 310 is located. The second hole 212 may be formed to be continuous to the first hole 211 in the direction of the first axis A1. The second hole 212 may be formed to have a diameter that is larger than that of the first hole 211. The second hole 212 may accommodate the head portion 332. Because the second hole 212 accommodates the head portion 332, the head portion 332 may stably support the axial load applied to the rotor 310.

The power generator 300 may further include a bearing 340. The bearing 340 may further include a bearing 340 for supporting the shaft portion 331 of the fixing shaft 330 during rotation of the fixing shaft 330. The bearing 340 may be a thrust bearing. A plurality of bearings 340 may be provided.

Figure 7:
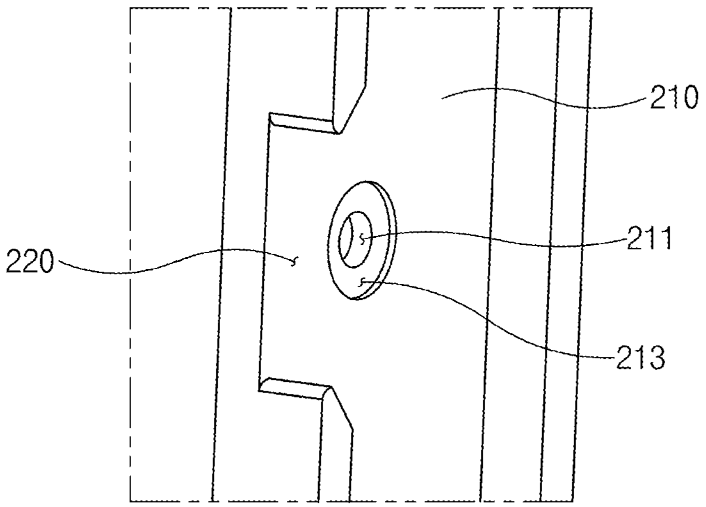
FIG. 7 is an enlarged perspective view illustrating a portion of a third hole in a feeder body of a forklift according to an embodiment of the present disclosure.

The feeder 200 may further include a third hole 213. FIG. 7 is an enlarged perspective view illustrating a portion of the third hole 213 in the feeder body 210 of a forklift according to an embodiment of the present disclosure. The third hole 213 may be formed in the feeder body 210, and may be formed on an opposite side to the second hole 212. That is, the third hole 213 may be formed on a surface of the feeder body 210, which is located on a side, on which the rotor 310 is located. The third hole 213 may be formed to be continuous to the first hole 211 in the direction of the first axis A1. The third hole 213 may be formed to have a diameter that is larger than that of the first hole 211 to accommodate the bearing 340. Because the third hole 213 accommodates the bearing 340, the bearing 340 may be stably seated, and lubricant applied to the bearing 340 may be prevented from spattering.

Figure 8:
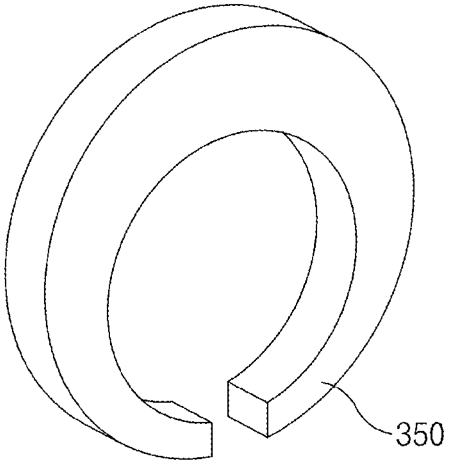
FIG. 8 is a perspective view illustrating a C-shaped ring of a forklift according to an embodiment of the present disclosure.

The power generator 300 may further include a C-shaped ring 350. FIG. 8 is a perspective view illustrating the C-shaped ring 350 of a forklift according to an embodiment of the present disclosure. The C-shaped ring 350 may be coupled to a side of the shaft portion 331, which is opposite to a side, on which the head portion 332 is located, and may hinder the bearing 340 and the rotor 310 from deviating from the shaft portion 331.

Left Guide Wall 120

Figure 9:
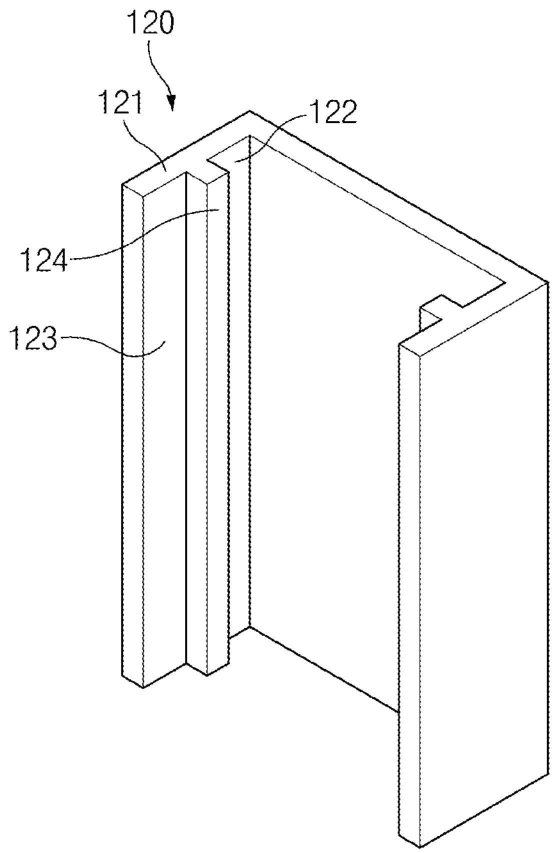
FIG. 9 is a perspective view illustrating a guide of a forklift according to an embodiment of the present disclosure, when viewed from another direction.

The left guide wall 120 may include a left guide wall body 121, a feeder contact surface 122, a rotor contact surface 123, and a partition member 124. FIG. 9 is a perspective view illustrating the guide 100 of a forklift according to an embodiment of the present disclosure, when viewed from another direction. The left guide wall body 121 may be formed at the left end of the guide body 110 along the vertical direction. The feeder contact surface 122 may extend in the left guide wall body 121 along the vertical direction. The feeder contact surface 122 may be formed to be adjacent to the guide body 110. The feeder 200 may contact the feeder contact surface 122. The feeder contact surface 122 may be formed of a material having a smaller frictional coefficient than the rotor contact surface 123, which will be described below.

The rotor contact surface 123 may extend in the left guide wall body 121 along the vertical direction. The rotor contact surface 123 may be located in the protrusion direction of the feeder contact surface 122. The protrusion direction may be a direction, in which the left guide wall 120 protrudes. The rotor 310 may contact the rotor contact surface 123 as the feeder 200 moves. The rotor contact surface 123 may be formed of a material having a larger frictional coefficient than the feeder contact surface 122. A frictional material having a large frictional coefficient may be applied to the circumferential surface of the rotor 310. The rotor 310 may be rotated by the frictional force between the rotor contact surface 123 and the rotor 310, and electricity may be produced through the rotation.

The partition member 124 may protrude from the left guide wall body 121 toward the right guide wall 130. The partition member 124 may be disposed between the feeder contact surface 122 and the rotor contact surface 123. The partition member 124 may partition the feeder contact surface 122 and the rotor contact surface 123. Because the partition member 124 partitions the feeder contact surface 122 and the rotor contact surface 123, the surface of the guide 100, which the feeder 200 contacts, and the surface of the guide 100, which the rotor 310 contacts, may be separated when the guide 100 is deformed due to a heavy load, whereby precision may be improved.

The rotor 310 may include a pinion gear, and the rotor contact surface 123 may include a rack that is engaged with the pinion gear. Through the rack and pinion structure, an insufficient frictional force between the rotor 310 and the rotor contact surface 123 may be supplemented.

The feeder 200 may include a first feeder body 201, a second feeder body 202, and a hydraulic pump. The first feeder body 201 may extend in the vertical direction. The second feeder body 202 may extend from an upper distal end of the first feeder body 201 to be perpendicular to the vertical direction. That is, the feeder 200 may have an "inverse L" shape as a whole. The hydraulic pump may be connected to the second feeder body 202 to move the feeder 200.

Battery 400

The battery 400 may include a BHDC and an LDC. The BHDC is an abbreviation for a bi-direction high voltage DC-DC converter. The BHDC may match balances of different output voltages of the high-voltage battery 410 and a fuel cell. The BHDC may start the fuel cell by raising a voltage from the high-voltage battery 410, and may charge the battery by decreasing the high voltage to a specific voltage. The LDC is an abbreviation for a low DC-DC converter. The LDC may start the fuel cell by raising a voltage from the low-voltage battery 420 during initial driving of a vehicle, and may charge the low-voltage battery 420 by using the voltage from the high-voltage battery 410.

Charging Operation

Hereinafter, an operation of charging the battery by the forklift according to the embodiment of the present disclosure will be described. The process of charging the battery by the forklift according to the embodiment of the present disclosure may be understood as a process of converting the potential energy of the fork and an article into electrical energy.

First, the forklift moves the feeder 200 upwards through the hydraulic pump.

Second, in a situation in which the fork is to be lowered, a force of moving the feeder 200 upwards is decreased by decreasing the hydraulic pressure of the hydraulic pump. As the hydraulic pressure is decreased, the fork is moved downwards by the self-weight of the fork and the load of the article mounted on the fork.

Third, as the fork is moved downwards, the rotor 310 starts to be rotated while contacting the rotor contact surface 123. As the rotor 310 is rotated, the rotary shaft 321 is also rotated. Then, due to the gear ratio of the rotor 310 and the rotary shaft 321, the rotary shaft 321 is rotated at a higher speed than the rotor 310.

Fourth, the generator 320 produces electricity through the rotation of the rotary shaft 321, and the produced electricity is charged in the high-voltage battery 410 through the BHDC or is charged in the low-voltage battery 420 through the LDC, and thus the battery is completely charged.

Self-Charging Apparatus

Hereinafter, the self-charging apparatus will be described. An embodiment of the present disclosure relates to a self-charging apparatus that may be used for a forklift or the like to increase a charging efficiency of a battery. The self-charging apparatus according to the embodiment of the present disclosure may include the guide 100, the feeder 200, the rotor 310, and the generator 320.

The guide 100 may extend upwards and downwards. The upward/downward movement of the feeder 200 may be guided by the guide 100. The feeder 200 may be configured such that an article is seated thereon. The feeder 200 may be moved upwards by the hydraulic pump, and may be moved downwards by the load of the article and the self-weight thereof. The rotor 310 may be coupled to one of the guide 100 and the feeder 200 to contact the other of the guide 100 and the feeder 200, and may be rotated forwardly and reversely by a frictional force generated by the contact. The forward and reverse rotation may refer to rotation in the clockwise direction and the counterclockwise direction. The generator 320 may include the rotary shaft 321. The rotary shaft 321 may rotate in conjunction with the rotation of the rotor 310. The generator 320 may produce electricity through the rotation of the rotary shaft 321.

According to the present disclosure, because the potential energy of a fork and an object loaded on the fork may be converted into electrical energy when the fork is lowered, the battery charging efficiency of the forklift may be improved.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. A forklift comprising:

a guide disposed in a forklift body;

a feeder configured to move together with a forklift fork along the guide;

a power generator coupled to one of the guide or the feeder to make contact with a remaining one of the guide or the feeder, and configured to produce electricity through rotation thereof due to the contact during relative movement between the guide and the feeder; and a battery configured to store the electricity produced by the power generator, wherein the power generator includes:

a rotor configured to rotate due to the contact; and a generator including a rotary shaft configured to receive a rotational force of the rotor and rotate for generation of power, wherein the rotor includes:

a first disk disposed in the one of the guide or the feeder to make the contact with the remaining one of the guide or the feeder, and coupled to the one of the guide or the feeder to be rotatable about a first axis due to the contact; and a second disk configured to rotate about the first axis together with the first disk, coupled to the first disk, and having gear teeth on a circumferential surface thereof, and wherein the rotary shaft has gear teeth engaged with the gear teeth of the second disk on a circumferential surface thereof to receive a rotational force from the second disk.

2. The forklift of claim 1, wherein when a leftward or rightward direction is defined along a horizontal direction that is perpendicular to a vertical direction, the guide includes:

a guide body extending in the vertical direction;

a left guide wall protruding from a left end of the guide body in a direction that is perpendicular to the vertical direction and the horizontal direction, and formed at the left end of the guide body along the vertical direction; and a right guide wall protruding from a right end of the guide body in parallel to a protrusion direction of the left guide wall, and formed at the right end of the guide body along the vertical direction, and wherein the feeder is disposed between the left guide wall and the right guide wall.

3. The forklift of claim 2, wherein the power generator includes:

a rotor being rotatable about a first axis that is in parallel to the protrusion direction of the left guide wall, and coupled to the feeder to contact the left guide wall; and a generator including a rotary shaft configured to receive a rotational force of the rotor and to rotate for generation of power.

4. A forklift comprising:

a guide disposed in a forklift body;

a feeder configured to move together with a forklift fork along the guide; and a power generator coupled to one of the guide or the feeder to make contact with a remaining one of the guide or the feeder, and configured to produce electricity through rotation thereof due to the contact during relative movement between the guide and the feeder, wherein when a leftward or rightward direction is defined along a horizontal direction that is perpendicular to a vertical direction, the guide includes:

a guide body extending in the vertical direction;

a left guide wall protruding from a left end of the guide body in a direction that is perpendicular to the vertical direction and the horizontal direction, and formed at the left end of the guide body along the vertical direction; and a right guide wall protruding from a right end of the guide body in parallel to a protrusion direction of the left guide wall, and formed at the right end of the guide body along the vertical direction, wherein the feeder is disposed between the left guide wall and the right guide wall, wherein the power generator includes:

a rotor being rotatable about a first axis that is in parallel to the protrusion direction of the left guide wall, and coupled to the feeder to contact the left guide wall; and a generator including a rotary shaft configured to receive a rotational force of the rotor and to rotate for generation of power, and wherein the power generator further includes a fixing shaft including a shaft portion extending in the direction of the first axis to form the first axis and coupled to the rotor, and a head portion disposed at one of opposite ends of the shaft portion, which is not coupled to the rotor, and having a diameter that is larger than a diameter of the shaft portion.

5. The forklift of claim 4, wherein the feeder includes:

a feeder body extending in the vertical direction and disposed between the left guide wall and the right guide wall;

a first hole passing through the feeder body in the direction of the first axis, the shaft portion being inserted thereinto; and a second hole formed on a surface of the feeder body, the second hole being located on a side that is opposite to a side, on which the rotor is located, to be continuous to the first hole in the direction of the first axis, the second hole having a diameter that is larger than a diameter of the first hole to accommodate the head portion.

6. The forklift of claim 5, wherein the power generator further includes a bearing configured to support the shaft portion of the fixing shaft during rotation of the fixing shaft, and wherein the feeder further includes a third hole formed in the feeder body to be continuous to the first hole in the direction of the first axis on an opposite side to the second hole, and having a diameter that is larger than a diameter of the first hole to accommodate the bearing.

7. The forklift of claim 3, wherein the left guide wall includes:

a left guide wall body formed at the left end of the guide body along the vertical direction;

a feeder contact surface extending in the left guide wall body along the vertical direction, disposed to be adjacent to the guide body, and being contacted with the feeder;

a rotor contact surface extending in the left guide wall body along the vertical direction, located in the protrusion direction of the feeder contact surface, and being contacted with the rotor as the feeder moves; and a partition member protruding from the left guide body toward the right guide wall, disposed between the feeder contact surface and the rotor contact surface, and partition the feeder contact surface and the rotor contact surface from each other.

8. The forklift of claim 7, wherein the rotor includes a pinion gear, and wherein the rotor contact surface includes a rack engaged with the pinion gear.

9. The forklift of claim 1, further comprising a frictional material applied to a circumferential surface of the rotor.

10. The forklift of claim 1, wherein the feeder includes:

a first feeder body extending in a vertical direction;

a second feeder extending from an upper distal end of the first feeder to be perpendicular to the vertical direction; and a hydraulic pump connected to the second feeder body and configured to move the feeder.

11. The forklift of claim 1, wherein the battery includes:

a bi-direction high voltage DC-DC converter (BHDC) configured to charge a high-voltage battery; and a low DC-DC converter (LDC) configured to charge a low-voltage battery.

12. A self-charging apparatus comprising:

a guide extending in an upward or downward direction;

a feeder configured such that an upward or downward movement thereof is guided by the guide, configured such that an article is seated on an upper side of the feeder, configured to move upwards with a hydraulic pump, and configured to move downwards by a load of the article and a self-weight thereof;

a rotor coupled to one of the guide or the feeder to make contact with a remaining one of the guide or the feeder, and configured to rotate forwardly or reversely with a frictional force generated due to the contact; and a generator including a rotary shaft and configured to produce electricity due to rotation of the rotary shaft that rotates in conjunction with the rotation of the rotor, wherein the rotor includes:

a first disk disposed in the one of the guide or the feeder to make the contact with the remaining one of the guide or the feeder, and coupled to the one of the guide or the feeder to be rotatable about a first axis due to the contact; and a second disk configured to rotate about the first axis together with the first disk, coupled to the first disk, and having gear teeth on a circumferential surface thereof, and wherein the rotary shaft has gear teeth engaged with the gear teeth of the second disk on a circumferential surface thereof to receive a rotational force from the second disk.

* * * * *